United States Patent [19]

Lawson et al.

[11] 3,957,722

[45] May 18, 1976

[54] FLAME-RESISTANT POLYBUTADIENE RESIN

[75] Inventors: David F. Lawson; Delmar F. Lohr, Jr., both of Akron, Ohio

[73] Assignee: The Firestone Tire & Rubber Company, Akron, Ohio

[22] Filed: Jan. 16, 1975

[21] Appl. No.: 541,531

Related U.S. Application Data

[63] Continuation of Ser. No. 376,486, July 5, 1973, abandoned.

[52] U.S. Cl. ............... 260/45.75 W; 260/23.7 M; 260/45.75 R; 260/45.95 G
[51] Int. Cl.$^2$.......................................... C08J 3/20
[58] Field of Search............ 260/45.75 W, 45.95 G, 260/45.75 R, 23.7 M

[56] References Cited

UNITED STATES PATENTS

| | | | |
|---|---|---|---|
| 3,326,832 | 6/1967 | Rauschenbach et al. | 260/45.75 R |
| 3,786,009 | 1/1974 | Lohr et al. | 260/45.75 |
| 3,786,087 | 1/1974 | Conard et al. | 260/41.5 A |
| 3,830,766 | 8/1974 | Praetzel et al. | 260/45.95 G |

*Primary Examiner*—V. P. Hoke

[57] ABSTRACT

The incorporation of a combination of [1] a bromine-releasing flame-retarding compound (e.g., tetrabromobenzene, hexabromobenzene, decabromodiphenyl oxide, etc.) and [2] a zinc O,O-dihydrocarbyl phosphorodithioate (e.g., a dialkyl or diaryl derivative) or a chelated complex containing vanadium (III) or manganese (II) (e.g., such as acetonylacetonate, etc.) in a polybutadiene resin, renders the resin flame resistant.

3 Claims, No Drawings

FLAME-RESISTANT POLYBUTADIENE RESIN

This is a continuation, of application Ser. No. 376,486 filed July 5, 1973 now abandoned.

FIELD OF THE INVENTION

This invention relates to butadiene polymer and copolymer resins, and more particularly to increasing the flame resistance of such resins.

BACKGROUND OF THE INVENTION

Butadiene polymer and copolymer resins, particularly those having, in the uncured state, a high proportion of butadiene units incorporated in 1,2-configuration, have come into considerable use, particularly as electrically insulating structural components, friction elements and the like.

It is an object of this invention to increase the flame resistance of butadiene polymer and copolymer resins.

PRIOR ART

In the parent application the Examiner has cited:

| | |
|---|---|
| Rauschenbach et al. | 3,326,832 |
| Matthews et al. | 3,474,464 |
| Vuillemont et al. | 3,282,882 |
| Yanagi et al. | 3,658,634 |
| Lohr et al. | 3,786,009 |
| Conard et al. | 3,786,087 |

SUMMARY OF THE INVENTION

The above and other objects are secured, in accordance with this invention in compositions comprising:

| | Parts by Weight |
|---|---|
| Polybutadiene resin | 100 |
| A bromine-releasing flame-retarding compound | 2–20 |
| Flame-retarding metal compound | 0.25–10.0 |
| A metal soap | 0.5–5.0 |
| The composition being cured by heating with presence of: | |
| A peroxide curing agent | 0.5–6.0 |

The above ingredients are, of course, exclusive of other compounding ingredients such as stabilizer, filler, and the like.

DESCRIPTION OF THE PREFERRED EMBODIMENTS

The Polybutadiene Resins

These may be any resins which are based on polymers of butadiene or copolymers of butadiene with up to 60%, based on the copolymers, of styrene. Also minor proportions, say up to 15% based on the copolymer of other ethylenically unsaturated compounds may be incorporated in the copolymers. These resins are usually prepared by (co) polymerizing the monomers by means of free radical or anionic catalysts to a relatively low molecular weight, say 1,000–200,000, so that they are of at least a flowable consistency. These low molecular weight (co) polymers are then incorporated with any desired fillers, reinforcing fibers or fabrics, pigments, etc., peroxide or other curing agents if desired, etc., and the composite is cured under heat and pressure to produce the desired finished article.

More particularly, there have recently been developed a class of polybutadiene resins having at least 40%, and preferably at least 60% by weight, of butadiene in the polymer molecule, and having at least 80% by weight of the butadiene therein in the vinyl type of butadiene repeating unit structure. The average molecular weight (determined by intrinsic viscosity measurement) is at least 12,500 and the molecular weight distribution is such that at least 50%, and preferably 90%, of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25°C. or about 0.68 taken at 30°C. The resin should also have a dilute solution viscosity of 0.2–0.7, preferably 0.3–0.6. The butadiene units are incorporated into the polymeric chain largely in the 1,2-configuration, preferably at least 80% of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO$. where R independently in each occurrence represents a hydrocarbon radical of 1–20 carbon atoms), and heating the polymers, usually under pressure. The curing temperature is advantageously at least 250°F. (121°C.), preferably about 300°–350°F. (149°–177°C.). Generally, no advantage in the process or product is obtained by exceeding a temperature of 420°F. (216°C.). Obviously, the higher the temperature the shorter will be the curing time required. Generally at 350°F. (177°C.) a satisfactory cure is obtained in less than 4 minutes, and in some cases even within a few seconds. Cure times of more than 4 minutes may be desirable in the event that the halogen or metal compound used retards the cure rate; in these cases cure times of up to 15 minutes generally give acceptable results. Where fast cures are desired it is necessary to use a filler to avoid crazing or cracking. A filler, such as silica, clay, powdered glass, alumina, etc., is advantageously used in the proportion of 25–65, preferably 40–60, volume per cent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

More particularly with regard to the inclusion of fillers, the present invention is of particular advantage in the stabilization of compositions containing silica fillers in amounts of 150 to 500 parts by weight per 100 parts by weight of butadiene polymer or copolymer. In such cases it is desirable to include 0.5 to 2.0 parts per 100 parts of silica of an agent for bonding the filler to the polybutadiene resin such as an unsaturated-group-containing silane on the order of vinyl triacetoxysilane, vinyl tributoxy silane, vinyl trimethoxysilane, and vinyl triethoxysilane.

THE METAL SOAP

The metal soap is preferably a Group II-A or II-B metal salt of an organic acid containing from 8 to 26 carbon atoms, and may be a mixture of any two or more such salts in any proportion. Calcium stearate is often preferred.

THE FLAME-RETARDING AGENTS

The flame-retarding materials of this invention include, per 100 parts of resin, 2 to 20 parts of a bromine-releasing flame-retarding compound, e.g., tetrabromobenzene or hexabromobenzene or decabromodiphenyl oxide, etc. and 0.3 to 10 parts of zinc-0,0-dihydrocarbyl phosphorodithioate or a chelated complex containing vanadium III or manganese II, e.g., acetylacetonate complexes of these metals.

The bromine-releasing flame-retarding compound is an aromatic compound which releases atomic or molecular bromine or a bromine compound such as hydrogen bromide, etc. on heating. The aromatic compounds are more stable and more valuable commercially than the aliphatic compounds.

The zinc-0,0-dihydrocarbyl phosphorodithioates include for example those in which each hydrocarbyl group is of the class consisting of (1) phenyl and naphthyl and hydrocarbon derivatives thereof containing 1 to 10 carbon atoms including, for example, tolyl, xylyl, butylphenyl, dibutylphenyl, acetylphenyl, dihexylphenyl, trihexylphenyl, tetraamylphenyl, diphenyl, alpha and beta naphthyl, dioxtyl phenyl; (2) linear and branched alkyl groups containing 1–20 carbon atoms, each alkyl group including, for example, propyl, ethyl, amyl, octyl, dodecyl, octadecyl, eicosyl, etc.

The chelated complexes include compounds of the following formula:

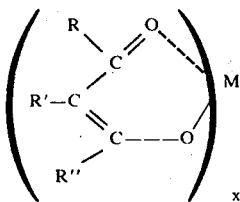

in which M is vanadium III or manganese II; $x$ is 3 when M = vanadium, 2 when M = manganese; and R and R'' are alkyl, aryl, O-alkyl or O-aryl, and are not necessarily the same; and R' is hydrogen, alkyl or aryl; the alkyl groups containing 1 to 15 carbon atoms including methyl and ethyl and linear and branched chain propyl, butyl, hexyl, decyl, dodecyl, etc.; and the aryl groups including phenyl and aryl and alkyl derivatives thereof in which the carbon atoms total 1 to 12 carbon atoms, including, for instance, tolyl, xylyl, propylphenyl, diamylphenyl, diphenyl, etc.

Similar compounds of related metals may be used, as well as other bromine-releasing flame-retarding compounds than those mentioned, such as, for example, perhalobiphenyls and perhalodiphenyloxides. There seems to be no benefit in the use of a mixture in which atoms of bromine to the atoms of the metal is less than 2 to 1; but it may be greater, and it appears to be dependent upon the state of oxidation of the metal added and the oxidation states that can form upon combustion; and varies with different compounds.

Different amounts of the flame-resisting metal additive were used with the above recipe. In the following example, we record the limiting oxygen index (LOI) [see below] value of a control and the various compositions with 10 parts of tetrabromobenzene. The amount of tetrabromobenzene may be varied and hexabromobenzene may be substituted. The amount of 10 parts was selected to show the flame-retarding effect of the mixtures; and with more or less of the bromobenzene compound used, the amount of the metal compound may be varied.

THE CURED RESINS

The cured resins produced in accordance with this invention have exceptional resistance to deterioration of physical properties upon exposure at high temperatures when properly stabilized, although the flame-retarding agents of this invention may decrease this resistance, when present. The resins are therefore useful in many situations where heat exposure is a factor, as in structural electrical components, cooking utensil handles, and automobile engine compartment components, and flame resistance is important.

LIMITING OXYGEN INDEX (LOI) TEST

The screening method used to indicate the flammability behavior in these examples is the limiting oxygen index (LOI) technique. This measurement is defined as the percentage of oxygen in a nitrogen-oxygen mixture which is sufficient to maintain combustion in a vertically-positioned, top-lighted specimen measuring ⅛ inch × ¼ inch × 5 inches. The LOI figure is determined by the following equation in which the bracketed units refer to the moles per volume of the oxygen and nitrogen in the atmosphere.

$$LOI = \frac{[O_2]}{[O_2]+[N_2]} \times 100$$

and is found by determining at what minimum oxygen concentration the polymer specimen will either a) burn longer than 3 minutes or b) burn further than three inches. The determination is repeated several times for verification. A more complete and detailed description of the LOI test is given in test specification ASTM D-2863-70.

It is evident from the definition of LOI that higher LOI numbers infer lower flammability of the specimens tested in this configuration. LOI numbers above 21–22 indicate that combustion is not sustained in an ambient atmosphere. It has been reported that for certain molding compounds LOI results can be used to predict performance in other flame tests; LOI numbers greater than 28 generally inferred satisfactory performance in HLT-15, UL-94 or UL-484 flame tests (described by M. A. Harpold and K. E. Atkins, Journal of Fire and Flammability, Vol. 4, No. 1, pp. 2–7 (1973)). For the purposes of the screening listed here, ranges of LOI were determined.

With the foregoing general discussion in mind, there are given herewith detailed experimental examples of the practice of this invention. All parts and percentages given are on the basis of weight, unless otherwise explicitly stated.

The following examples are illustrative of the use of the flame-retarding agents of this invention with different bromine-releasing flame-retarding agents. A solvent such as any aliphatic hydrocarbon, e.g., hexane, may be used in compounding the ingredients but is not essential.

EXAMPLE I

|  | Parts by Weight |
|---|---|
| Polybutadiene* | 100 |
| Silica | 380 |
| Vinyl triacetoxysilane | 3 |
| Calcium stearate | 3 |
| Dicumyl peroxide (40%) | 7.5 |
| Tetrabromobenzene | 10 |
| Flame-retarding metal compounds | (See table) |

*90% of butadiene units in 1,2-configuration; molecular weight Parameters $M_z$ = 29,000, $M_n$ = 23,000, DSV = 0.3

The different samples were thoroughly mixed and dried under vacuum to remove hexane or other solvent, if used to facilitate mixing, and then pressed into 6 inches × 6 inches × ⅛ inch plaques and cured at 350°F., under 10 tons pressure for 8 minutes. These plaques were cut into ¼" strips for LOI tests. The results of a control prepared as above and several plaques containing different metal flame-resisting compounds subjected to the LOI test, and tested for hardness, are recorded in the following table, the weights being given in parts per 100 parts of the resin.

| Flame-Retarding Agent | Parts | LOI | Rockwell E |
|---|---|---|---|
| None | — | 27.5–28.0 | 80–90 |
| A | 0.5 | 28.5 | 84 |
| A | 2.0 | 29.5 | 79 |
| B | 0.5 | 29.5–30.0 | 21 |
| B | 2.0 | 31.5–32.0 | 8 |
| C | 2.0 | 28.5–29.0 | 86 |

A = Zinc-O,O-diisopropylphosphorodithioate
B = Vanadium (III) acetylacetonate
C = Manganese (II) acetylacetonate The Rockwell E hardness tests are included to show that the flame-retarding agents may affect the physical properties of the resins, but even the softer resins may be useful in certain applications. The results show definite improvement in the flame resistance of the resins.

EXAMPLE II

The same polybutadiene resin was used as in Example I and the same formulation except that 10 parts by weight of decabromodiphenyloxide was used instead of tetrabromobenzene. The zinc compound showed no improvement in the LOI test.

| Flame-Retarding Agent | Parts | LOI | Rockwell E |
|---|---|---|---|
| None | — | 26.0–26.5 | 89 |
| A | 2.0 | 26.0–26.5 | 75 |
| B | 2.0 | 27.5–28 | 8 |
| C | 2.0 | 27.0–27.5 | 81 |

We claim:
1. A peroxide-cured or peroxide-curable polybutadiene polymer or copolymer with styrene resin which includes as a flame-retarding agent, per 100 parts by weight of the resin, (1) substantially 10 parts by weight of tetrabromobenzene and (2) substantially 0.5 to 2 parts of zinc -0,0- dihydrocarbyl phosphorodithioate in which the hydrocarbyl group is an alkyl group containing from 1 to 20 carbons, said resin being from the class consisting of homopolymers of butadiene and copolymers of butadiene and styrene containing at least 40 per cent by weight of butadiene, the ratio of the atoms of bromine to the atoms of metal being at least substantially 2 to 1, and at least 80 percent by weight of the butadiene repeating units in the homopolymer or copolymer being in the 1,2 configuration.

2. The composition of claim 1 in which the resin is butadiene homopolymer.

3. The composition of claim 2 in which the alkyl group is isopropyl.

\* \* \* \* \*